Patented Feb. 15, 1938

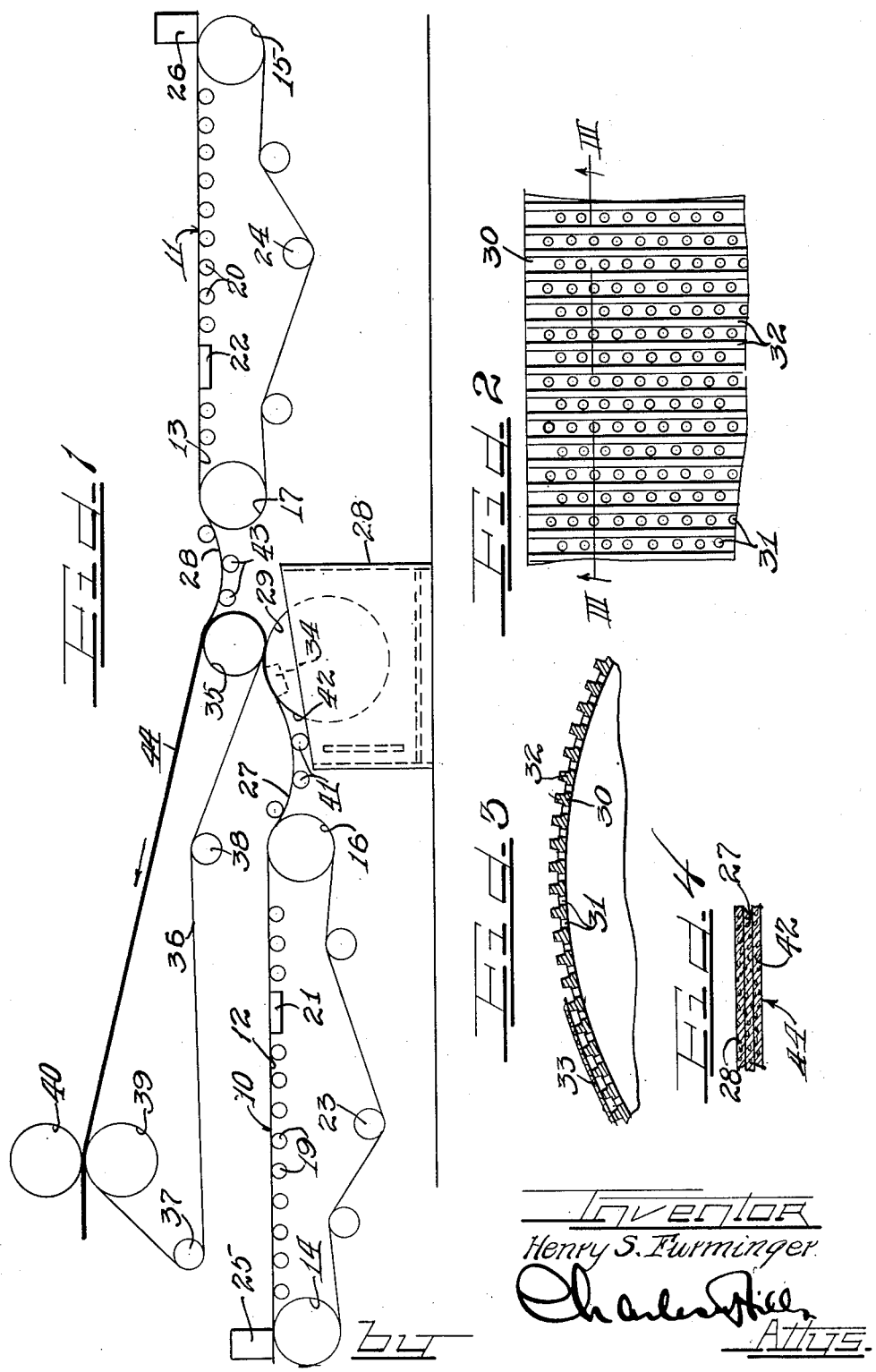

2,108,116

UNITED STATES PATENT OFFICE 2,108,116

PAPER MAKING MACHINE

Henry Street Furminger, Appleton, Wis.

Application May 4, 1936, Serial No. 77,777

4 Claims. (Cl. 92—39)

This invention relates to a paper making machine and to a method of making a composite web of fibrous material.

It has heretofore been proposed to make composite fibrous web material on multi-Fourdrinier or multi-cylinder mold machines, and also on machines of a modified type of Fourdrinier comprising perforated cylinders with endless Fourdrinier wires traveling therearound.

As distinguished from these prior art devices, the present invention relates to the combination of a plurality of Fourdrinier forming sections with a cylinder mold, preferably so arranged that the web formed on the cylinder mold is sandwiched between the webs from the Fourdrinier forming sections and in contact with the wire sides of said latter webs. Alternatively, however, the cylinder mold may be used without any stock in the vat, merely as a means for transferring the web from one Fourdrinier to a pick-up felt, in which case the resulting composite web is a duplex or multi-Fourdrinier sheet. In either case the combination of Fourdrinier forming sections with a cylinder mold enables the formation of a composite web that is devoid of two sidedness, since the wire sides of the two or more Fourdrinier formed webs lie on the inside of the composite web. The arrangement, furthermore, permits the use of a filler of entirely different characteristics, different furnish and the like, from the characteristics of the outer laminations of the composite web.

The present invention, therefore, lends itself to the manufacture of particular types of paper where a composite web composed of laminations having different or distinguishing characteristics is desirable. Among the uses to which my invention may be applied may be mentioned the manufacture of safety papers, paper currency, book papers, blotting paper, drawing papers, blueprint paper, and the like.

It is therefore an important object of this invention to provide a device for the manufacture of composite fibrous web material, paper and the like, whereby a plurality of webs formed on a Fourdrinier wire are superimposed upon themselves or upon a web formed on a cylinder mold in such a way as to avoid the so-called "two sided effect" of a Fourdrinier formed web.

It is a further important object of this invention to provide a combination of a plurality of Fourdrinier forming sections with a cylinder mold, and a pick-up felt cooperating with the cylinder mold to pick-up and superimpose the Fourdrinier webs directly upon themselves, or with the web formed on the cylinder mold sandwiched between and in contact with the wire sides of the webs formed on the Fourdrinier sections.

It is a further important object of this invention to provide a method for the manufacture of composite webs free from two sidedness and comprising a multi-Fourdrinier sheet or a built up sheet having a web formed on the cylinder mold sandwiched between webs formed on Fourdriner sections.

Other and further important objects of this invention will be apparent from the disclosures in the specification and the accompanying drawing.

This invention (in a preferred form) is illustrated in the drawing and hereinafter more fully described.

On the drawing:

Figure 1 is a diagrammatic side elevational view of an installation embodying the principles of my invention.

Figure 2 is a fragmentary top plan enlarged view of the cylinder mold.

Figure 3 is a fragmentary sectional view taken substantially along the line III—III of Fig. 2.

Figure 4 is an enlarged fragmentary sectional view of a composite sheet made in accordance with this invention.

As shown on the drawing:

The reference numerals 10 and 11 indicate generally a pair of Fourdrinier forming sections arranged so that the upper runs of the wires 12 and 13, respectively, travel toward each other. Each of said Fourdrinier forming sections may be of conventional or usual construction, including breast rolls 14 and 15, couch rolls 16 and 17, table rolls 19 and 20, suction boxes 21 and 22 and idling and tensioning rolls 23 and 24, respectively. Stock of the same or different characteristics is flowed onto the wires 12 and 13 from head boxes 25 and 26, respectively, and water drained therefrom by gravity and suction as the wire passes over the table rolls and suction boxes to form wet webs of paper 27 and 28, respectively.

The couch or delivery ends of said Fourdrinier forming sections 10 and 11 are spaced sufficiently to permit the installation therebetween of a vat 28 of a cylinder machine web forming section therebetween. A cylinder mold 29 is mounted for rotation within the vat 28 in the usual manner and comprises a transversely ribbed shell 30 having a series of perforations 31 at the bottoms of the troughs formed by the ribs 32. Said shell 30 is covered with a fine mesh wire 33 stretched tightly over the crests of the ribs 32.

It will be understood that modified forms of Fourdrinier sections and cylinder molds may be used in place of those shown and described. Likewise, more than two Fourdrinier forming sections may be employed, if desired. The important feature of the invention is that the Fourdrinier and cylinder mold forming sections are so arranged so that the wire sides of the Fourdrinier formed webs lie inside of the composite web and against the web, if any, formed on the cylinder mold. This is accomplished by the novel arrangement about to be described.

The cylinder mold 29 is preferably provided with a stationary suction box or chamber 34 (Fig. 1) extending substantially the full length of the mold 29 and positioned slightly in advance of the nip between a cooperating couch roll 35 and said cylinder mold 29. A pick-up felt 36 is trained around said couch roll 35 over a plurality of rolls 37 and 38 to pass back over the Fourdrinier forming section 10 and between the nip of a pair of press rolls 39 and 40.

The web 27 formed upon the Fourdrinier section 10 is supported by means of a plurality of idling or driven rolls 41 in its passage to the mold 29, where the web 27 is superimposed upon a web 42 that is being formed on said mold 29. The point of contact of the web 27 with the web 42 is preferably at, or about the beginning of the area on the surface of the cylinder mold that is subject to the suction effect of the suction chamber or box 34. In this way the webs 27 and 42 are drawn more closely together by the suction effect and water is drawn from both webs as the periphery of the mold passes over the suction chamber 34.

The couch roll 35 causes the pick-up felt 36 to contact the superimposed webs 27 and 42 while supported upon the cylinder mold 29 at a point preferably beyond the suction area created by the suction box 34. The pick-up felt is of such porosity and surface characteristics as to pick the superimposed webs 27 and 42 off of the wire 37 of the cylinder mold 29 to carry said superimposed webs on its surface.

As the superimposed webs pass along with the pick-up felt 36, the web 28 is transferred from the wire 13 at the couch roll 17 and lead over a plurality of idling or driven rolls 43 to be deposited upon said superimposed webs 27 and 42. As will be noted, the arrangement is such that the cylinder formed web 42 is sandwiched between the two webs 27 and 28, each of which has its wire side in contact with said cylinder formed web 42.

The composite web thus formed, now indicated by the reference numeral 44, is carried upon the surface of the pick-up felt 36 between the press rolls 39 and 40, where the composite web is further compacted and additional water squeezed therefrom. It will be understood, of course, that one or more of the rolls 39 and 40 may be a suction roll, or that baby press rolls may be installed to act upon the upper run of the pick-up felt 36 which carries the composite web 44. After said composite web 44 is passed through the press rolls 39 and 40, it may be transferred to another felt for passage through one or more subsequent press rolls and thence to the drier to be dried and finished in any desired manner.

The stock furnished to the cylinder mold vat 28 may be of an entirely different character, quality or furnish from that supplied to the Fourdrinier forming sections 10 and 11. For instance, a stock heavily laden with filler, or a colored stock, or a particularly free or a particularly slow stock may be supplied to the cylinder vat 28, while stock furnishes imparting good printing or other characteristics to the webs 27 and 28, when finished, may be supplied to the Fourdrinier forming sections 10 and 11. A great many different possibilities are afforded by an arrangement such as described.

In the finished composite web 44, shown in Fig. 4, the constituent laminations 28, 27 and 42 are quite firmly united by reason of their having been superimposed while wet and subjected to the compacting action of suction and pressure, or of pressure alone. Consequently, the outer laminations cannot be peeled off without totally destroying the structure and appearance of the sheet.

It will be appreciated that the forming section and other parts of the combination web making machine of my invention have been shown only diagrammatically and that any elements common to Fourdrinier and cylinder types of paper making machines, such as feeding, screening, driving and other mechanisms and the like, may be supplied in a manner well known to those skilled in the art.

Also, as previously stated, the cylinder mold 29 may be run without any stock in its vat 28. In that case the surface of said cylinder mold serves merely to receive the web 27 and transfer it to the pick-up felt 36, where the other Fourdrinier web, or webs, are superimposed thereover. The resulting composite web is a duplex or multi-Fourdrinier sheet. Such an arrangement as this is more practical than to have the pick-up felt cooperate directly with the Fourdrinier couch roll to lift the web off the wire, since the felt would be liable to mark or wrinkle the wire.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A paper making machine including two spaced opposed Fourdrinier wires having their upper runs traveling toward each other, a cylinder mold in the space between the two wires, means for forming paper webs on said wires, means located to contact a bare web from one of the wires for guiding the web directly from the wire onto the cylinder mold, a looped felt above the cylinder mold and entirely in spaced relation above the wire delivering the web to the mold, said felt having its upper run traveling in a direction opposite to the direction of travel of the upper run of the wire therebeneath, a couch roll within the loop of said felt in pressure relation with the cylinder mold at a point located after the point where the Fourdrinier web is deposited on the mold to contact the felt against the web for picking up the web to travel with the felt around the couch roll and on the upper run of the felt and means located to contact the bare web from the other Fourdrinier wire for guiding said web directly from said wire onto the web already on the felt.

2. A paper making machine including two spaced opposed Fourdrinier wires having their upper runs traveling toward each other, means for forming paper webs on said wires, a cylinder mold in the space between the two wires for receiving thereon a web directly from one of said wires, a looped felt above the cylinder mold and entirely in spaced relation above the wire delivering the web to the mold, said felt having its upper run traveling in a direction opposite to the direction of travel of the upper run of the wire therebeneath, a couch roll within the loop of said felt in pressure relation with the cylinder mold at a point located after the point where the Fourdrinier web is deposited on the mold to contact the felt against the web for picking up the web to travel with the felt around the couch roll and on the upper run of the felt, a suction box within the cylinder mold defining the suction area on the mold between the point where the Fourdrinier web is deposited on the cylinder mold and the point where the felt picks up the web and the other Fourdrinier wire being so positioned as to deliver the web formed thereon directly onto the web already on the upper run of the felt.

3. A paper making machine including two spaced opposed Fourdrinier wires having their upper runs traveling toward each other, a cylinder mold disposed in the space between said two wires, means for forming paper webs on said wires and on said cylinder mold, rolls located to contact the bare web from one of said wires for guiding said web onto the web on said cylinder mold, a single looped felt above the cylinder mold and entirely in spaced relation above said wire delivering the web to the mold, said felt having its upper run traveling in a direction opposite to the direction of travel of the upper run of said wire, a couch roll within the loop of said felt in pressure relation with the cylinder mold at a point located after the point where the Fourdrinier web is deposited on the mold to contact the felt against the web for picking up the webs from the mold to travel with the felt around the couch roll and on the upper run of the felt, rolls located to contact the bare web from the other Fourdrinier wire to guide said web directly from said wire on top of the cylinder formed web on the upper run of the felt for travel therewith and press rolls receiving the webs and felt therebetween.

4. A paper making machine including two spaced opposed Fourdrinier wires having their upper runs traveling toward each other, a cylinder mold disposed in the space between said two wires, means for forming paper webs on said wires and on said cylinder mold, rolls located to contact the bare web from one of said wires for guiding the web directly onto the web on said cylinder mold, a single looped felt above the cylinder mold and entirely in spaced relation above said wire delivering the web to the mold, said felt having its upper run traveling in a direction opposite to the direction of travel of the upper run of said wire, a couch roll within the loop of said felt in pressure relation with the cylinder mold at a point located after the point where the Fourdrinier web is deposited on the mold to contact the felt against the web for picking up the webs from the mold to travel with the felt around the couch roll and on the upper run of the felt, a suction box within the cylinder mold defining a suction area on the mold between the point where the Fourdrinier web is deposited on the cylinder web and the point where the felt picks up the web, rolls located to contact the bare web from the other Fourdrinier wire for guiding said web directly from said other wire on top of the cylinder formed web on the upper run of the felt for travel therewith and press rolls receiving the webs and felt therebetween.

HENRY STREET FURMINGER.